(12) United States Patent
Morikawa

(10) Patent No.: US 8,261,604 B2
(45) Date of Patent: Sep. 11, 2012

(54) ABNORMALITY DETERMINATION DEVICE AND METHOD FOR INTERNAL COMBUSTION ENGINE

(75) Inventor: Atsushi Morikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 147 days.

(21) Appl. No.: 12/744,335

(22) PCT Filed: Nov. 25, 2008

(86) PCT No.: PCT/IB2008/003219
§ 371 (c)(1),
(2), (4) Date: May 24, 2010

(87) PCT Pub. No.: WO2009/068963
PCT Pub. Date: Jun. 4, 2009

(65) Prior Publication Data
US 2010/0242581 A1    Sep. 30, 2010

(30) Foreign Application Priority Data
Nov. 27, 2007 (JP) ................................ 2007-305980

(51) Int. Cl.
*G01M 15/04* (2006.01)
(52) U.S. Cl. .................... 73/114.49; 73/114.15
(58) Field of Classification Search ............... 73/114.15, 73/114.49
See application file for complete search history.

(56) References Cited

U.S. PATENT DOCUMENTS

| | | | | |
|---|---|---|---|---|
| 5,773,716 A | * | 6/1998 | Antonioli et al. | 73/114.51 |
| 5,806,498 A | * | 9/1998 | Iwai et al. | 123/502 |
| 7,007,664 B2 | * | 3/2006 | Takemoto et al. | 123/305 |
| 7,234,436 B2 | * | 6/2007 | Surnilla et al. | 123/198 DB |
| 7,685,996 B2 | * | 3/2010 | Brehob | 123/406.47 |
| 7,707,994 B2 | * | 5/2010 | Haraguchi | 123/479 |
| 8,051,704 B2 | * | 11/2011 | Kim et al. | 73/114.49 |
| 2006/0154784 A1 | | 7/2006 | Surnilla et al. | 477/111 |
| 2008/0147299 A1 | | 6/2008 | Haraguchi | |
| 2008/0295802 A1 | * | 12/2008 | Poignant et al. | 123/406.47 |

FOREIGN PATENT DOCUMENTS

| | | |
|---|---|---|
| EP | 0 785 358 A2 | 7/1997 |
| EP | 0 810 364 A2 | 12/1997 |
| EP | 0 982 485 A2 | 3/2000 |
| JP | 05-187300 A | 7/1993 |
| JP | 05-263697 A | 10/1993 |
| JP | 07-103047 A | 4/1995 |
| JP | 2002-188502 A | 7/2002 |
| JP | 2004-308464 A | 11/2004 |
| JP | 2007-255230 A | 10/2007 |
| WO | WO 2007010129 A1 * | 1/2007 |

* cited by examiner

*Primary Examiner* — Freddie Kirkland, III
(74) *Attorney, Agent, or Firm* — Sughrue Mion, PLLC

(57) ABSTRACT

An ECU executes a program including: a control to advance or retard the fuel injection timing by a prescribed value; determining whether the torque output variation of an engine exceeds a threshold torque output variation; and determining the fuel injection timing to be abnormal if the torque output variation of the engine is equal to or below the threshold torque output variation.

15 Claims, 5 Drawing Sheets

ABNORMALITY DETERMINATION DEVICE AND METHOD FOR INTERNAL COMBUSTION ENGINE

BACKGROUND OF THE INVENTION

1. Field of the Invention

The present invention relates to an abnormality determination device and an abnormality determination method for an internal combustion engine, and more particularly to a technique to determine if the fuel injection timing is abnormal.

2. Description of the Related Art

Internal combustion engines in which fuel is injected from an injector, such as diesel engines, are known. Internal combustion engines (in particular, diesel engines) output torque according to the fuel injection timing from the injector. That is, the fuel injection timing significantly influences the output torque. Thus, the desired torque is not output if the fuel injection timing is abnormal. Therefore, it is desirable to determine if the fuel injection timing is abnormal using an on-board diagnostic system (OBD).

Japanese Patent Application Publication No. 5-187300 (JP-A-5-187300) discloses an malfunction cause determination device for a fuel device that can determine the cause of a failure when an error has occurred in fuel injection timing control. The malfunction cause determination device disclosed in JP-A-5-187300 includes: a target injection timing calculation section that calculates the target fuel injection timing supplied from a fuel injection pump to an internal combustion engine according to the operating state of the internal combustion engine; an actual injection timing detection section that detects the actual fuel injection timing of the internal combustion engine; a fuel injection timing control section that performs feedback control so as to match the actual injection timing to the target injection timing; an malfunction determination section that compares the actual injection timing and the target injection timing to determine that a malfunction has occurred if the deviation between the injection timings is out of a predetermined range; and a determination section that determines whether the variation band of the actual injection timing is in a predetermined range when the malfunction determination section has determined a malfunction, to determine a failure of the fuel injection pump if the variation band of the actual injection timing is in the predetermined range.

In the malfunction cause determination device described in this publication, the malfunction determination section determines whether the deviation between the actual fuel injection timing and the target fuel injection timing falls within a predetermined range, and if the malfunction determination section determines a malfunction, the determination section determines whether the variation band of the actual injection timing falls within a predetermined range to determine that a failure of the fuel injection pump has occurred if the variation band of the actual injection timing falls within the predetermined range.

In the malfunction cause determination device described in JP-A-5-187300, a malfunction is determined according to the difference between the actual injection timing and the target injection timing. Therefore, it is difficult to determine whether there is a malfunction unless the target injection timing is constant. However, the target injection timing is often difficult to keep constant during operation of the internal combustion engine. Therefore, there has been room for further improvement to precisely determine a malfunction.

SUMMARY OF THE INVENTION

The present invention provides an abnormality determination device and an abnormality determination method for an internal combustion engine to more precisely determine whether the fuel injection timing is abnormal.

A first aspect of the present invention is directed to an abnormality determination device for an internal combustion engine that includes a fuel injection mechanism. The abnormality determination device includes: a change section that changes the fuel injection timing of the injection mechanism; and a determination section that determines the fuel injection timing is abnormal if a torque output variation of the internal combustion engine is equal to or below a threshold torque output variation after the fuel injection timing has been changed. A second aspect of the present invention is directed to an abnormality determination method for an internal combustion engine that includes a fuel injection mechanism. The abnormality determination method includes: changing an fuel injection timing of the injection mechanism; and determining whether the fuel injection timing is abnormal, wherein it is determined that the fuel injection timing is abnormal if a torque output variation of the internal combustion engine is equal to or below a threshold torque output variation after the fuel injection timing has been changed.

According to this configuration, because the torque of the internal combustion engine varies according to the fuel injection timing, the injection timing of the injection mechanism is changed. If the torque output variation of the internal combustion engine is equal to or below the threshold torque output variation after the fuel injection timing is changed, the actual fuel injection timing has not changed. Hence, if the torque output variation of the internal combustion engine is equal to or below the threshold torque output variation after the fuel injection timing is changed, it is determined that the fuel injection timing is abnormal. This allows precise determination of abnormality of the injection timing. As a result, it is possible to provide an abnormality determination device and an abnormality determination method for an internal combustion engine that can precisely determine an abnormality of the injection timing.

In addition to the configuration of the first aspect, the internal combustion engine may include a plurality of cylinders. The change section may change the fuel injection timing in a single cylinder of the plurality of cylinders.

According to this configuration, if the fuel injection timing is normal, the output torque, in the combustion stroke (expansion stroke), of the cylinder for which injection timing has been changed, will be different from the output torque, in the combustion stroke, of the other cylinders. Therefore, the output torque is allowed to vary significantly. As a result, it is possible to precisely determine whether the fuel injection timing is abnormal based on the torque output variation.

In addition to the configuration of the first aspect, the internal combustion engine may include a plurality of cylinders. The change section may store a first injection mode in which the fuel injection timing of a single cylinder of the plurality of cylinders is changed, and a second injection mode in which the fuel injection timing for all of the cylinders is to be changed. The change section may select either the first injection mode or the second injection mode to change the injection timing.

When the fuel injection timing of a single cylinder of the plurality of cylinders is changed, if the fuel injection timing is normal, the output torque, in the combustion stroke (expansion stroke), of the cylinder for which injection timing has been changed, may be made different from the output torque, in the combustion stroke, of the other cylinders. Therefore, the output torque is allowed to vary significantly. When the fuel injection timing for all of the cylinders is changed, the torque output variation, in the combustion stroke, for all of the cylinders may be made substantially uniform. This allows reduction of the vibration generated due to changing of the injection timing. Therefore, the torque output variation may be detected precisely. In either case, it is possible to precisely determine whether the injection timing is abnormal based on the torque output variation.

In addition to the configuration of the first aspect, the internal combustion engine may include a plurality of cylinders. The change section may advance the fuel injection timing for one of two consecutively firing cylinders, and retard the fuel injection timing for the other cylinder.

According to this configuration, if the fuel injection timing is normal, the difference between the output torque, in the combustion stroke (expansion stroke), of the one cylinder and the output torque, in the combustion stroke, of the other cylinder is increased. Therefore, the output torque is allowed to vary significantly. As a result, it is possible to precisely determine whether the fuel injection timing is abnormal based on the torque output variation.

In addition to the configuration of the first aspect, the change section may select either an injection mode in which the injection timing is retarded or an injection mode in which the fuel injection timing is advanced for changing the injection timing.

According to this configuration, the output torque may be reduced or increased. Therefore, it is possible to precisely determine whether the injection timing is abnormal based on the torque output variation.

In addition to the configuration of the aspects described above, the change section may change the fuel injection timing to fall within a first interval determined according to an operating state of the internal combustion engine. The determination section may determine that the fuel injection timing is abnormal if the torque output variation of the internal combustion engine is equal to or below a first threshold torque output variation after the fuel injection timing is changed to fall within the first interval.

According to this configuration, for example, the injection timing is changed to fall within an interval where the torque output variation rate with respect to the injection timing is great, and it is determined whether the injection timing is abnormal. This allows the output torque to vary significantly if the injection timing is normal. Therefore, it is possible to precisely determine whether the fuel injection timing is abnormal based on the torque output variation.

In addition to the configuration of the above aspects, the torque output variation rate of the internal combustion engine with respect to the injection timing may be greater when the fuel injection timing falls within the first interval than when the fuel injection timing falls within a second interval. The change section may change the fuel injection timing to fall within the first interval. The determination section may determine that the fuel injection timing is abnormal if the torque output variation of the internal combustion engine is equal to or below a first threshold torque output variation after the fuel injection timing is changed to fall within the first interval.

According to this configuration, the fuel injection timing is changed fall within an interval where the torque output variation rate with respect to the fuel injection timing is great, and it is determined whether the injection timing is abnormal. This allows the output torque to vary widely if the injection timing is normal. Therefore, it is possible to precisely determine whether the fuel injection timing is abnormal based on the torque output variation.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
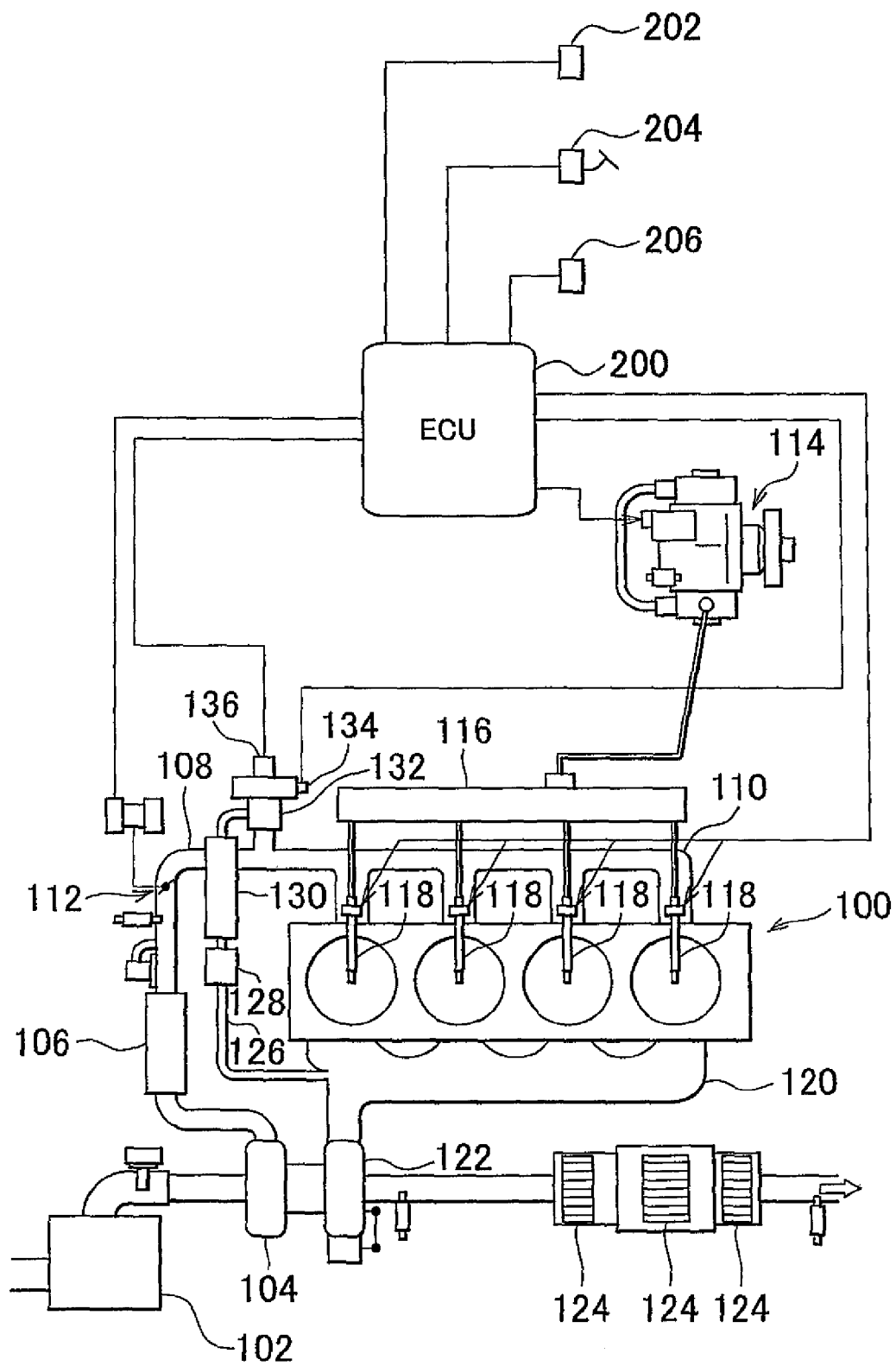
FIG. 1 is a schematic diagram that shows the configuration of an engine equipped with a abnormality determination device in accordance with a first embodiment of the present invention.

A description will hereinafter be made of embodiments of the present invention with reference to the drawings. In the following description, the same components are denoted by the same reference numerals. Their names and functions are also the same. Therefore, they will not be described in detail repeatedly.

Referring to FIG. 1, an engine 100 equipped with an abnormality determination device in accordance with a first embodiment of the present invention will be described. The engine 100 is a diesel engine. However, an internal combustion engine other than a diesel engine may also be used. The engine 100 is provided with a plurality of cylinders.

Air drawn into the engine 100 is filtered by an air cleaner 102, and compressed by a compressor 104 of a turbocharger. The compressed air is cooled by an intercooler 106 through heat exchange with outside air, passes through an intake pipe 108 and an intake manifold 110, and is inducted into a combustion chamber. The amount of fresh air contained in the air that is inducted to the combustion chamber is controlled by a throttle valve 112. An electronic control unit (ECU) 200 controls the opening amount of the throttle valve 112. The throttle valve 112 may be omitted.

Fuel is pressurized by a supply pump 114 and stored in a common rail 116 before being injected to the combustion chamber by an injector 118. A mixture of air and fuel is combusted in the combustion chamber for the engine 100 to produce a driving force.

An injector 118 is provided for each cylinder. The target fuel injection timing is determined according to a map having parameters such as the accelerator operation amount, the rotational speed of the output shaft of the engine 100, and the vehicle speed, for example. The target fuel injection timing may be set via conventional methods, which will not be described herein.

The fuel injection amount from the injector 118 is determined according to a map having parameters such as the accelerator operation amount, the rotational speed of the output shaft of the engine 100, and the vehicle speed, for example. During idling, the fuel injection amount is determined by idle speed control (ISC) such that the output shaft rotational speed of the engine 100 reaches a target rotational speed. The fuel injection amount may be set conventional methods, which will not be not described herein.

The air-fuel mixture after the combustion, that is, exhaust gas, is guided to an exhaust manifold 120, passes through a turbine 122 of the turbocharger, then is purified by a catalyst 124, and discharged to the outside of the vehicle.

Part of the exhaust gas is recirculated via an exhaust gas recirculation (EGR) pipe 126 coupled to the exhaust manifold 120. The exhaust gas flowing through the EGR pipe 126 passes through an oxygen catalyst 128, and is cooled by an EGR cooler 130 through heat exchange with coolant. The cooled exhaust gas is recirculated via an EGR valve 132 into the intake air at a location downstream of the throttle valve 112.

The amount of exhaust gas that is recirculated (EGR amount) is adjusted by the EGR valve 132. The EGR valve opening amount is controlled by an EGR valve linear solenoid 134. Normally, the EGR valve opening amount is controlled such that as the torque of the engine 100 increases, the EGR valve 132 decreases, that is, the amount of exhaust gas that is recirculated is decreased. Specifically, the EGR valve opening amount, which is detected using an EGR valve lift sensor 136, is input to the ECU 200 to perform feedback control of the EGR valve opening amount such that the oxygen concentration in the intake air, which changes with EGR, reaches a target value in accordance with the state of the engine 100 (engine speed, boost pressure, temperatures of various parts, load, intake air amount). The EGR valve 132 may alternatively be actuated by negative pressure or a motor, rather than by the EGR valve linear solenoid 134.

The ECU 200 receives a signal from an output shaft rotational speed sensor (crank position sensor) 202, an accelerator operation amount sensor 204, a vehicle speed sensor 206, and so forth.

The output shaft rotational speed sensor 202 detects the output shaft rotational speed of the engine 100. In this embodiment, the ECU 200 detects the torque output variation based on the variation amount of the output shaft rotational speed of the engine 100. That is, it is determined that the output torque has varied if the output shaft rotational speed has varied.

The accelerator operation amount sensor 204 detects the amount by which the accelerator pedal is depressed. The vehicle speed sensor 206 detects the speed of the vehicle equipped with the engine 100. As the vehicle speed, for example, the rotational speed of the output shaft of a transmission connected to the engine 100 may be detected.

The ECU 200 performs operations for controlling the engine 100 based on the signal transmitted from these sensors, a program and a map stored in a memory (not shown), and so forth.

Figure 2:
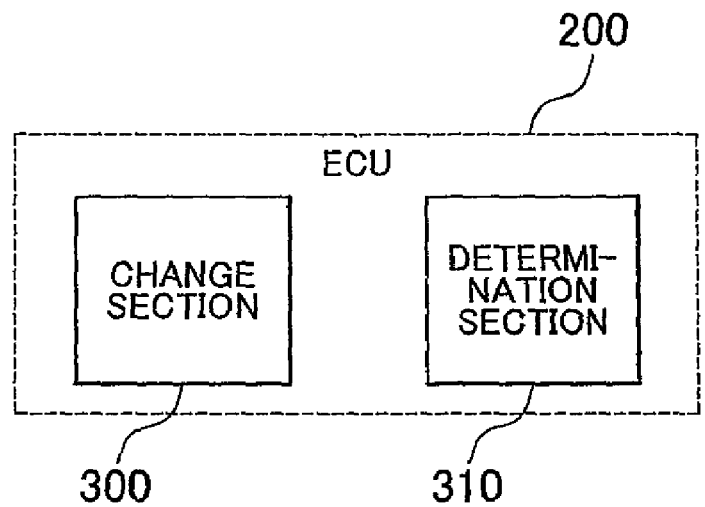
FIG. 2 is a functional block diagram that shows the function of an ECU in accordance with the first embodiment of the present invention.

Referring to FIG. 2, the function of the ECU 200 in accordance with this embodiment will be described. It should be noted that the function of the ECU 200 described below may be implemented through either hardware or software.

Figure 3:
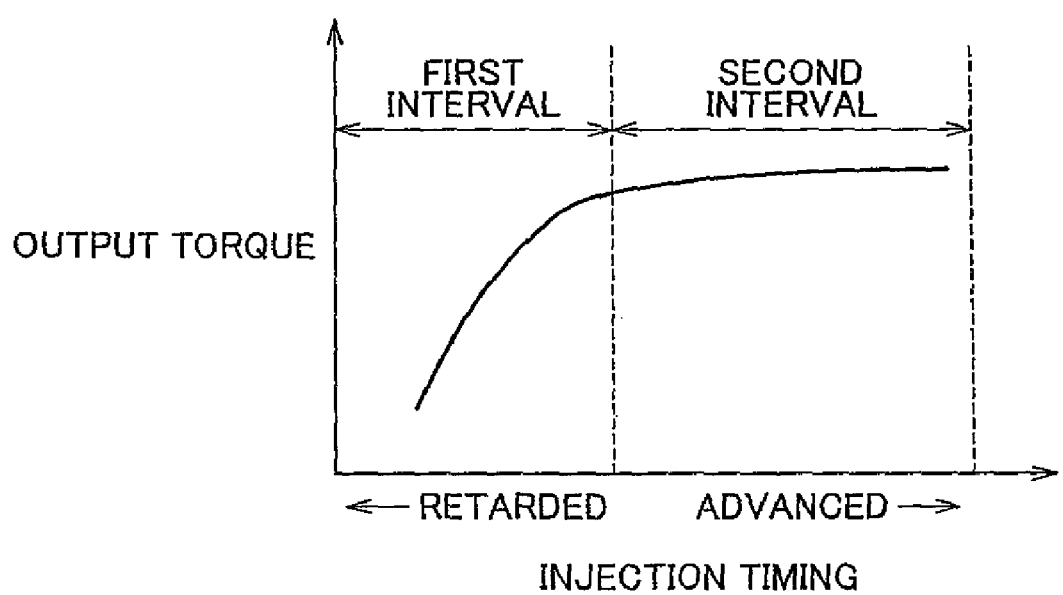
FIG. 3 is a chart that shows the relationship between the fuel injection timing and the output torque of the engine.

The ECU 200 includes a change section 300 and a determination section 310. The change section 300 changes the fuel injection timing from the injector 118. As shown in FIG. 3, the torque output variation rate (output shaft rotational speed) with respect to the injection timing is greater when the injection timing is in a first interval than when the injection timing is in a second interval. Thus, the injection timing is changed to be in the first interval.

Figure 4:
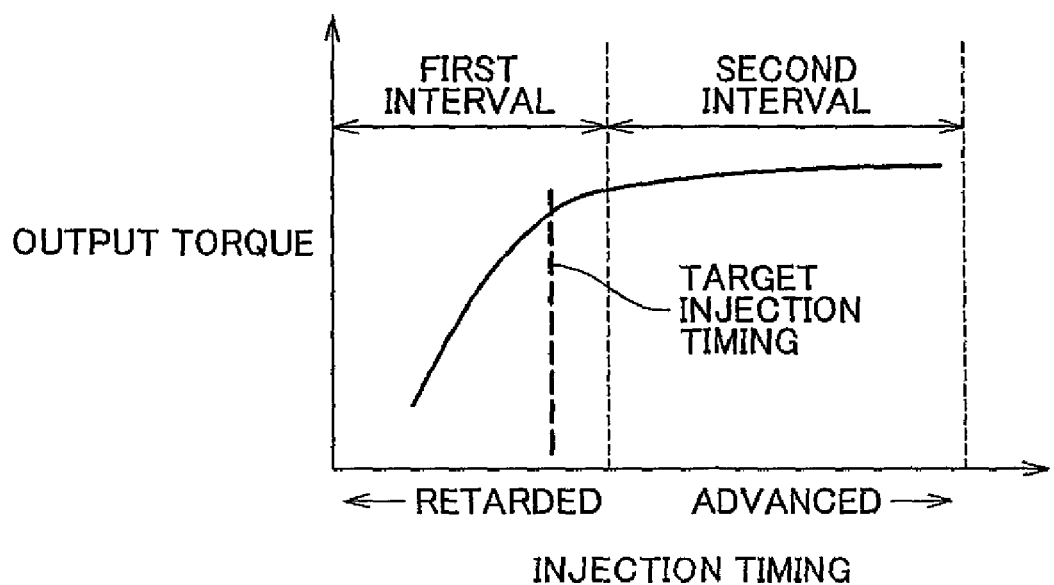
FIG. 4 is a chart (part 1) that shows the target fuel injection timing.

The first interval and the second interval shown in FIG. 4 can be made different according to the operating state of the engine 100 (whether it is idling, for example). Thus, the first interval, to which the injection timing is to be changed, is determined according to the operating state of the engine 100.

Figure 5:
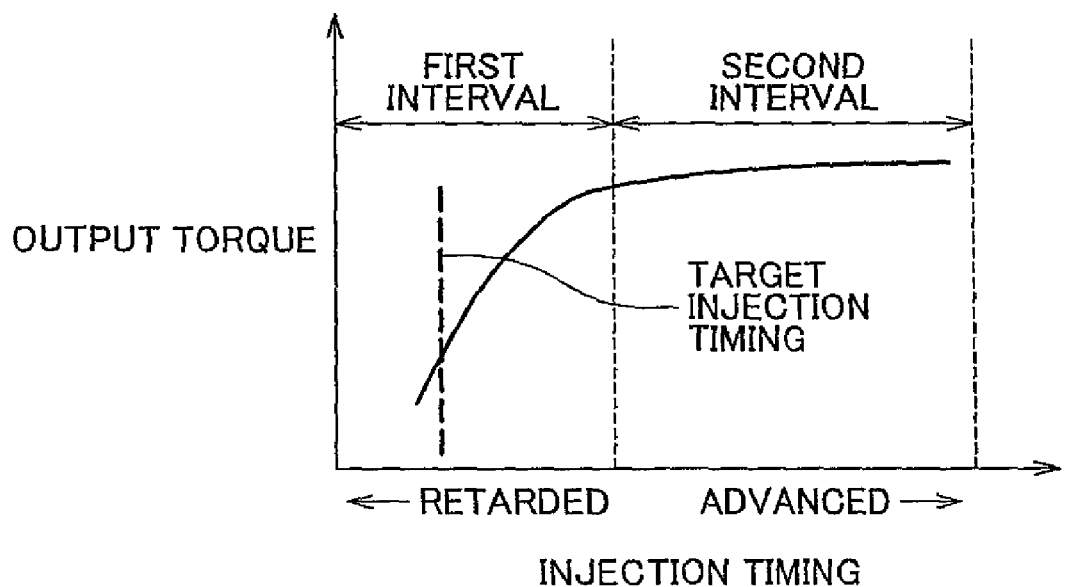
FIG. 5 is a chart (part 2) that shows the target fuel injection timing.

The decision to advance or retard the injection timing is determined based on the operating state of the engine 100 (specifically, the target injection timing). For example, in the operating state where the target injection timing is set as shown in FIG. 4, the injection timing is retarded to significantly vary the output torque with respect to the injection timing. On the other hand, in the operating state where the target injection timing is set as shown in FIG. 5, the injection timing is advanced, because the range for retarding the timing is narrow. The injection timing may be changed in other ways.

The fuel injection timing for any of the cylinders may be changed. The cylinder for which injection timing of fuel is to be changed may be changed in accordance with the operating state of the engine 100. The fuel injection timing in multiple cylinders may also be changed.

The determination section 310 determines whether the injection timing is abnormal based on the variation in torque output from the engine 100 after the fuel injection timing has been changed. It is determined whether the injection timing is abnormal based on the torque output variation of the engine 100 after the fuel injection timing has been changed to be in the first interval discussed above and shown in FIG. 3.

In this embodiment, the torque output variation may be detected indirectly from the variation of the output shaft rotational speed of the engine 100. It is determined that the fuel injection timing is abnormal if the torque output variation of the engine 100, that is, the variation of the output shaft rotational speed, is equal to or below a threshold torque output variation after the fuel injection timing has been changed. Conversely, it is determined that the fuel injection timing is normal if the torque output variation of the engine 100 exceeds the threshold torque output variation after the fuel injection timing has been changed.

Figure 6:
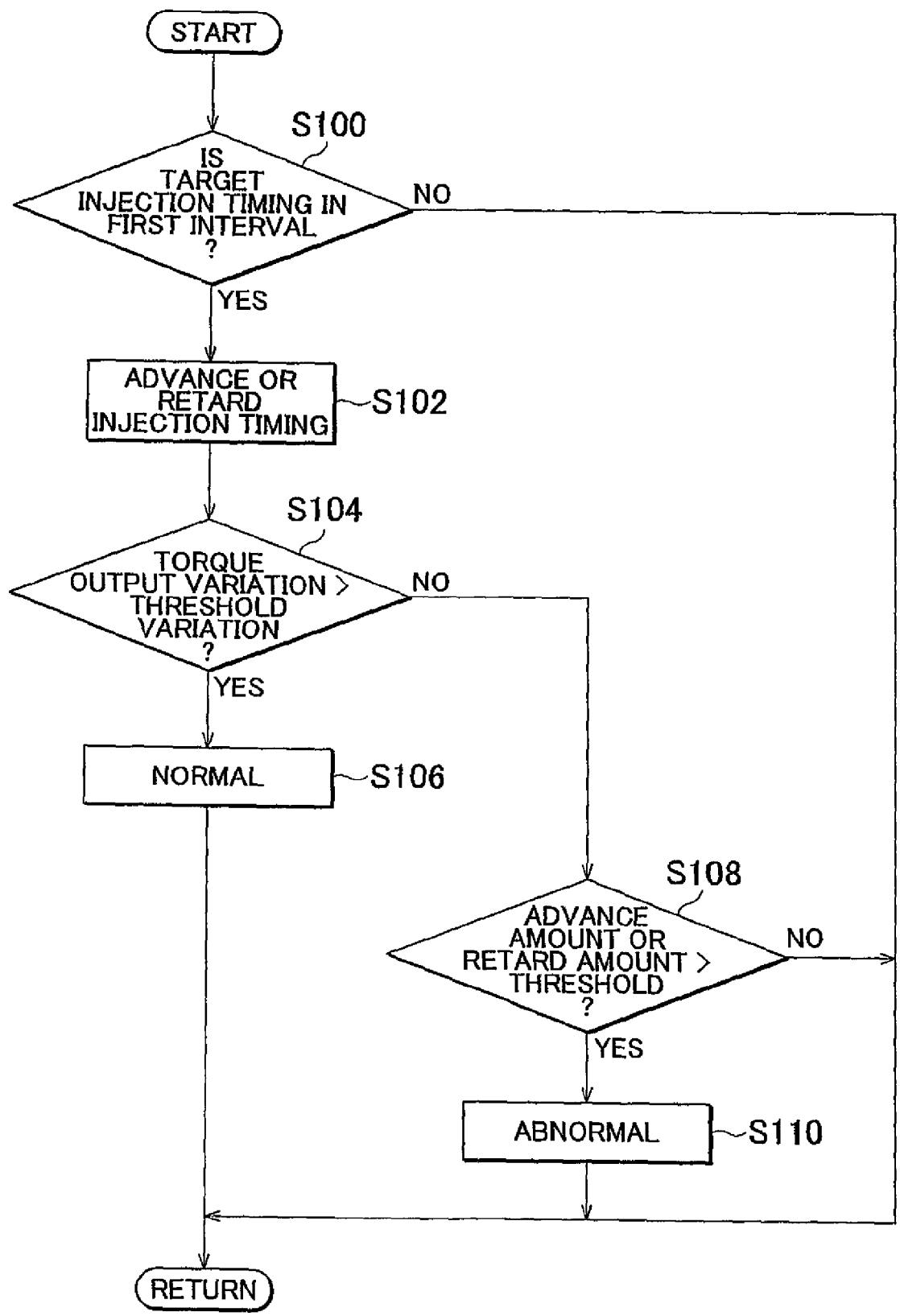
FIG. 6 is a flowchart that shows the control structure of a program to be executed by the ECU in accordance with the first embodiment of the present invention.

Referring to FIG. 6, the control structure of a program that is executed by the ECU 200 in this embodiment will be described. It should be noted that the program described below is executed at predetermined intervals. The program that is executed by the ECU 200 may be stored in a recording medium such as a compact disc (CD) and a digital versatile disc (DVD) to be distributed in the market.

In step (hereinafter, the term "step" is abbreviated to "S") 100, the ECU 200 determines whether the target fuel injection timing falls within the first interval discussed above and shown in FIG. 3. If the target fuel injection timing falls within the first interval (YES in S100), the process proceeds to S102. That is, a determination as to whether the fuel injection timing is malfunctioning is allowed. If not (NO in S100), the process returns to S100.

In S102, the ECU 200 advances or retards the injection timing in at least one selected cylinder by a prescribed value. In S104, the ECU 200 determines whether the torque output variation of the engine 100, that is, the variation amount of the output shaft rotational speed (the variation amount of the output shaft rotational speed, in the expansion stroke, of the selected cylinder exceeds a threshold torque output variation.

If the torque output variation of the engine 100 exceeds the threshold torque output variation (YES in S104), the process proceeds to S106. If not (NO in S104), the process proceeds to S108. In S106, the ECU 200 determines that the fuel injection timing is normal. Then, the process returns to S100.

In S108, the ECU 200 determines whether the advance amount or the retard amount of the fuel injection timing exceeds a timing adjustment threshold. If the advance amount or the retard amount of the fuel injection timing exceeds the timing adjustment threshold (YES in S108), the process proceeds to S110. If not (NO in S108), the process returns to S100.

In S110, the ECU 200 determines that the fuel injection timing is abnormal. Then, the process returns to S100.

The operation of the abnormality determination device in accordance with this embodiment, based on the structure and the flowchart described above, will be described.

During operation of the engine 100, if the target fuel injection timing falls within the first interval (YES in S100), the prerequisite for abnormality determination is satisfied. In this case, the injection timing for any one of the cylinders may be advanced or retarded by a prescribed value (S102).

If the fuel injection timing is normal, the torque output in the combustion stroke of the cylinder for which injection timing has been changed differs from the torque output of the other cylinders in the combustion stroke. That is, the output torque of the engine 100 may vary. Hence, if the torque output variation of the engine 100 exceeds a threshold torque output variation (YES in S104), it is determined that the fuel injection timing is normal (S106).

On the other hand, if the torque output variation of the engine 100, that is, the variation of the output shaft rotational speed, is equal to or below the threshold torque output variation (NO in S104), the torque output of the engine 100 may be not in sync with the fuel injection timing. In this case, it is determined whether the advance amount or the retard amount of the fuel injection timing is greater than a timing adjustment threshold (S108).

If the advance amount or the retard amount of the fuel injection timing exceeds the timing adjustment threshold (YES in S108), it is extremely likely that the actual fuel injection timing has not changed in compliance with the control. Hence, the fuel injection timing is determined to be abnormal (S110).

As has been described above, according to the abnormality determination device in accordance with this embodiment, the fuel injection timing is determined to be abnormal if the torque output variation of the engine is equal to or below a threshold torque output variation after the fuel injection timing has been changed. This allows precise determination of abnormality of the injection timing.

A second embodiment of the present invention will be described next. This embodiment differs from the first embodiment in that an injection mode in which the fuel injection timing of a single cylinder of the plurality of cylinders is changed or an injection mode in which the fuel injection timing for all of the cylinders is changed, may be selected. The other components are the same as those of the foregoing first embodiment. They are also provided with the same functions. Thus, they will not be described again in detail.

Figure 7:
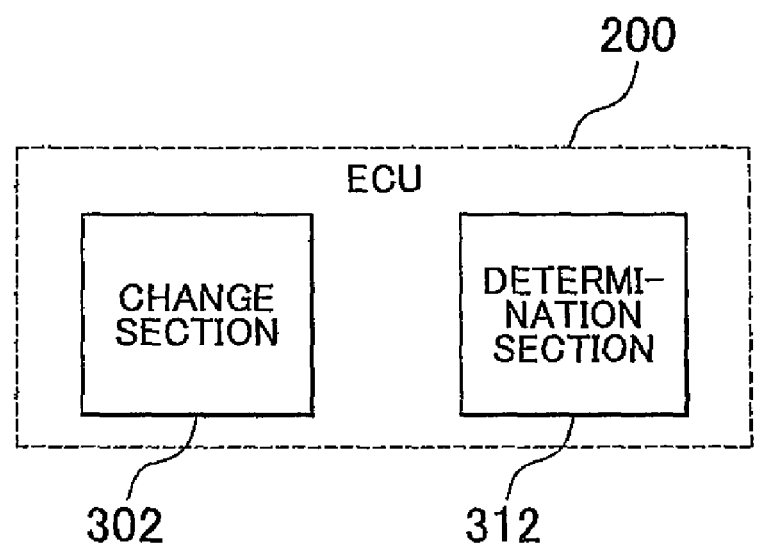
FIG. 7 is a functional block diagram that shows the function of an ECU in accordance with a second embodiment of the present invention.

Referring to FIG. 7, the function of the ECU 200 in accordance with this embodiment will be described. It should be noted that the function of the ECU 200 described below may be implemented by means of hardware or software.

In this embodiment, a change section 302 of the ECU 200 selects either an injection mode in which the fuel injection timing of a single cylinder of the plurality of cylinders is changed ("single cylinder mode") and an injection mode in which the fuel injection timing for all of the cylinders is changed ("all-cylinder mode"), for changing the fuel injection timing from the injector 118. For example, if the engine 100 is not idling, the single cylinder mode may be selected. If the engine 100 is idling, the all cylinder mode is selected. This is because varying the output torque for only one cylinder when the engine 100 is idling may increase the vibration of the engine 100. The other functions of the change section 302 are the same as those of the change section 300 of the first embodiment.

In the single cylinder mode, a determination section 312 indirectly detects the torque output variation from the variation of the output shaft rotational speed of the engine 100 to determine whether the injection timing is abnormal. However, in the all-cylinder mode, the determination section 312 indirectly detects the torque output variation from the amount of increase or decrease in the fuel injection amount by the ISC to determine whether the injection timing is abnormal. This is because a decrease or an increase in the output torque decreases or increases the output shaft rotational speed, which in turn causes the ISC to increase or decrease the fuel injection amount. The other functions of the determination section 312 are the same as those of the determination section 310 of the first embodiment.

In the single cylinder mode, if the fuel injection timing is normal, the torque output in the combustion stroke of the cylinder for which injection timing has been changed may be made different from the output torque, in the combustion stroke, of the other cylinders. Therefore, wide variations in torque output are allowed. In the all-cylinder mode, the torque output variation, in the combustion stroke, for all of the cylinders may be made substantially uniform. This reduces the vibration generated due to changing of the injection timing. Therefore, the torque output variation may be detected precisely. In either case, it is possible to precisely determine whether the fuel injection timing is abnormal based on the torque output variation.

A third embodiment of the present invention will be described next. This embodiment differs from the first embodiment in that the fuel injection timing for one of two consecutively firing cylinders is advanced and the fuel injection timing for the other cylinder is retarded. The other components are the same as those of the first embodiment. They are also provided with the same functions. Thus, they will not be described in detail again here.

Figure 8:
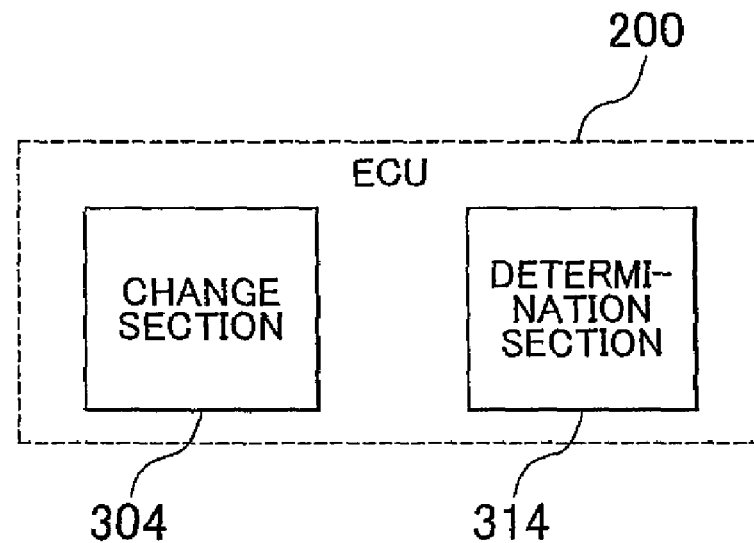
FIG. 8 is a functional block diagram that shows the function of an ECU in accordance with a third embodiment of the present invention.

Referring to FIG. 8, the function of the ECU 200 in accordance with this embodiment will be described. It should be noted that the function of the ECU 200 described below may be implemented by means of hardware or software.

In this embodiment, a change section 304 of the ECU 200 advances the fuel injection timing for one of two consecutively firing cylinders and retards the fuel injection timing for the other cylinder, to change the fuel injection timing from the injector 118. The other functions of the change section 304 are the same as those of the change section 300 of the first embodiment. The functions of the determination section 314 are the same as those of the determination section 310 of the first embodiment.

If the fuel injection timing is normal, by advancing the fuel injection timing in one of two consecutively firing cylinders and retarding the fuel injection timing in the other cylinder, it is possible to increase the difference between the output torque, in the combustion stroke, of the one cylinder and the output torque, in the combustion stroke, of the other cylinder. Therefore, wide variations in torque output are allowed. As a result, it is possible to precisely determine whether the fuel injection timing is abnormal based on the torque output variation.

The embodiments described herein should be construed as illustrative and not restrictive in all respects. The scope of the present invention is defined not by the above description but by the appended claims, and the present invention is intended to cover all equivalents and modifications that may fall within the scope of the claims.

The invention claimed is

1. An abnormality determination device for an internal combustion engine provided with a fuel injection mechanism, the abnormality determination device comprising:
   a change section that changes a fuel injection timing of the injection mechanism; and
   a determination section that determines the fuel injection timing is abnormal if a torque output variation of the internal combustion engine is equal to or below a threshold torque output variation after the fuel injection timing is changed.

2. The abnormality determination device for an internal combustion engine according to claim 1, wherein:
   the internal combustion engine includes a plurality of cylinders; and
   the change section changes the fuel injection timing in only one cylinder of the plurality of cylinders.

3. The abnormality determination device for an internal combustion engine according to claim 1, wherein:
   the internal combustion engine includes a plurality of cylinders;
   the change section stores a first injection mode in which the fuel injection timing of a single cylinder of the plurality of cylinders is changed, and a second injection mode in which the fuel injection timing for all of the cylinders is changed; and
   the change section selects either the first injection mode or the second injection mode to change the injection timing.

4. The abnormality determination device for an internal combustion engine according to claim 1, wherein:
   the internal combustion engine includes a plurality of cylinders; and
   the change section advances the fuel injection timing for one of two consecutively firing cylinders, and retards the fuel injection timing for the other cylinder.

5. The abnormality determination device for an internal combustion engine according to claim 1, wherein
   the change section selects either an injection mode in which the fuel injection timing is retarded or an injection mode in which the fuel injection timing is advanced for changing the injection timing.

6. The abnormality determination device for an internal combustion engine according to claim 5, wherein
   the change section selects the injection mode in which the torque output variation is greater when the fuel injection timing is changed.

7. The abnormality determination device for an internal combustion engine according to claim 1, wherein:
   the change section changes the fuel injection timing to fall within a first interval determined according to an operating state of the internal combustion engine; and
   the determination section determines that the fuel injection timing is abnormal if the torque output variation of the internal combustion engine is equal to or below a first threshold torque output variation after the fuel injection timing is changed to fall within the first interval.

8. The abnormality determination device for an internal combustion engine according to claim 1, wherein:
   the torque output variation rate of the internal combustion engine with respect to the injection timing is greater when the fuel injection timing falls within the first interval than when the fuel injection timing falls within a second interval;
   the change section changes the fuel injection timing to fall within the first interval; and
   the determination section determines that the fuel injection timing is abnormal if the torque output variation amount of the internal combustion engine is equal to or below a first threshold torque output variation after the fuel injection timing is changed to fall within the first interval.

9. An abnormality determination method for an internal combustion engine provided with a fuel injection mechanism, the abnormality determination method comprising:
   changing a fuel injection timing of the injection mechanism; and
   determining whether the fuel injection timing is abnormal, wherein it is determined that the fuel injection timing is abnormal if a torque output variation of the internal combustion engine is equal to or below a threshold torque output variation after the fuel injection timing is changed.

10. The abnormality determination method for an internal combustion engine according to claim 9, wherein:
    the internal combustion engine includes a plurality of cylinders; and
    the fuel injection timing is changed in only one cylinder of the plurality of cylinders.

11. The abnormality determination method for an internal combustion engine according to claim 9, wherein:
    the internal combustion engine includes a plurality of cylinders;
    the fuel injection timing is changed according to either a first injection mode, in which the fuel injection timing of a single cylinder of the plurality of cylinders is changed, or a second injection mode, in which the fuel injection timing of all the cylinders is changed.

12. The abnormality determination method for an internal combustion engine according to claim 9, wherein:
    the internal combustion engine includes a plurality of cylinders;
    the fuel injection timing for one of two consecutively firing cylinders is advanced, and the fuel injection timing for the other cylinder is retarded.

13. The abnormality determination method for an internal combustion engine according to claim 9, wherein
    either an injection mode in which the injection timing is retarded or an injection mode in which the fuel injection timing is advanced is selected to change the injection timing.

14. The abnormality determination method for an internal combustion engine according to claim 9, wherein:
    the fuel injection timing is changed to fall within a first interval that is determined according to an operating state of the internal combustion engine; and
    it is determined that the fuel injection timing is abnormal if the torque output variation of the internal combustion engine is equal to or below a first threshold torque output variation after the injection timing fuel is changed to fall within the first interval.

15. The abnormality determination method for an internal combustion engine according to claim 9, wherein:
    a first interval is set such that a torque output variation of the internal combustion engine is greater when the fuel injection timing falls within the first interval than when the fuel injection timing falls within a second interval;
    the fuel injection timing is changed to fall within the first interval; and
    it is determined that the fuel injection timing is abnormal if the torque output variation of the internal combustion engine is equal to or below a first threshold torque output variation after the fuel injection timing is changed to fall within the first interval.

* * * * *